United States Patent
Saltanov et al.

(10) Patent No.: US 6,839,411 B1
(45) Date of Patent: Jan. 4, 2005

(54) GRAPHICAL USER INTERFACE AND METHOD FOR DISPLAYING MESSAGES

(75) Inventors: Alexey Saltanov, Santa Clara, CA (US); Benjamin B. Tang, San Carlos, CA (US); Sharon Brown, Campbell, CA (US); Tom Hill, Cupertino, CA (US)

(73) Assignee: Mitel, Inc., Herndon, VA (US)

( * ) Notice: Subject to any disclaimer, the term of this patent is extended or adjusted under 35 U.S.C. 154(b) by 0 days.

(21) Appl. No.: 09/259,985

(22) Filed: Mar. 1, 1999

(51) Int. Cl.[7] .............................................. H04M 1/64
(52) U.S. Cl. .................... 379/88.13; 709/706; 345/837; 715/500.1; 715/526
(58) Field of Search .................. 379/67.1, 88.11–17, 379/93.01, 93.17, 93.24; 709/206; 345/752, 763, 700, 764, 816, 835, 837, 846, 847; 715/500, 514, 515, 526, 500.1

(56) References Cited

U.S. PATENT DOCUMENTS

| | | | |
|---|---|---|---|
| 5,349,636 A | | 9/1994 | Irribarren |
| 5,530,740 A | | 6/1996 | Irribarren et al. |
| 5,717,742 A | * | 2/1998 | Hyde-Thomson ........ 379/88.17 |
| 5,737,395 A | | 4/1998 | Irribarren |
| 5,760,823 A | * | 6/1998 | Brunson et al. ......... 348/14.03 |
| 5,771,355 A | | 6/1998 | Kuzma |
| 5,794,039 A | * | 8/1998 | Guck .......................... 707/10 |
| 5,835,084 A | * | 11/1998 | Bailey et al. ............... 345/783 |
| 5,841,966 A | | 11/1998 | Irribarren |
| 6,134,566 A | * | 10/2000 | Berman et al. ............. 707/526 |

FOREIGN PATENT DOCUMENTS

| | | |
|---|---|---|
| GB | 2 334 404 A | 8/1999 |
| WO | WO 96/24213 | 8/1996 |
| WO | WO 96/37989 | 11/1996 |

OTHER PUBLICATIONS

John Levine et al., "Windows 98—The Complete Reference", Jun. 5, 1998, Osborne/McGraw–Hill, Chapter 23.*
Athabasca University, "Virtual Helpdesk—Using Internet Explorer and Outlook Express", Date Unknown, Athabasca University, see the "Attachments" topic.*
The Patent Office [GB], "The Patent Office—Group Wise 5.5", 1999, Lesson 2, Working with Messages, pp. 4, 16–18 and i.*

* cited by examiner

*Primary Examiner*—Roland Foster
(74) *Attorney, Agent, or Firm*—Beyer Weaver & Thomas, LLP

(57) ABSTRACT

A graphical user interface is disclosed that displays messages to a user in a manner such that attached or embedded message (as well as attachments to the embedded messages) within a message can be easily viewed with reduced user effort. The graphical user interface can be implemented in a variety of messaging systems, including electronic mail systems, unified messaging systems, voice mail systems, etc.

11 Claims, 17 Drawing Sheets

GRAPHICAL USER INTERFACE AND METHOD FOR DISPLAYING MESSAGES

FIELD OF THE INVENTION

The present invention relates to messaging systems and, in particular, to a messaging system including a graphical user interface for displaying messages.

BACKGROUND OF THE INVENTION

Voice messaging systems are common in today's business community. Most business organizations or enterprises make use of a private branch exchange (PBX) to direct a caller's telephone call to the appropriate extension of the called party. If the called party is unable to answer the telephone call, the telephone call is forwarded to a voice messaging system which allows the caller to leave a voice message in the mailbox assigned to the called party. Messages left for called parties within the business organization can be retrieved from memory by calling the voice messaging system using a telephone and entering appropriate commands via a touch-tone keypad. Retrieved messages can be played, forwarded or deleted. An example of a voice messaging system of this nature is the VoiceMemo II® sold by Centigram Communications Corporation of San Jose, Calif.

In addition to voice messages, communications within business organizations are also often stored in facsimile and text formats. In the past, separate messaging systems have been used to handle these different types of communications. Unfortunately, prior art messaging systems designed to handle one type of communication have not provided any means to interact with messaging systems handling other types of communications. This has required users to access each messaging system individually to retrieve messages and has required business organizations to maintain and manage multiple messaging systems separately. As a result, it has been necessary to establish separate accounts, address lists and message mailboxes in each messaging system for the various users in the business organizations.

More recently, attempts have been made to interconnect different messaging systems to provide access to different types of messages from a single point. For example, U.S. Pat. No. 5,349,636 to Irribarren discloses a system and method for voice mail systems and interactive voice response (IVR) systems. The Irribarren system includes a voice message system and a text message system integrated via a network which coordinates the functions of each individual message system. A user may access messages stored in the voice message system and in the text message system via a single telephone call. Although this system allows access to different types of messages, the voice message and text message systems require separate management.

The current trend is to integrate these various messaging systems to allow users to access all types of communications once a connection is made to the messaging system. To that end, unified messaging systems have been developed to provide users access to virtually all of their communications. Messaging systems of this nature store all messages for entities within the enterprise at a common location. The entity may be an individual, group, department, or any appropriate logical organization. Users accessing the messaging system via a telephone, desktop computer or other communication device, have access to all of their messages regardless of message type and regardless of the type of communication device used to access the messaging system. Appropriate message translators such as text-to-speech (TTS) converters, speech-to-text (SST) converters etc. are included to enable users to retrieve messages stored in formats not supported by the communication devices used to access the messaging system.

When a user accesses a messaging system of this nature through a personal computer, the messages in the user's mailbox are presented to the user via a graphical user interface established by the messaging software executed by the personal computer. As an example, well known messaging software of this nature, is sold by Microsoft Corporation under the name Microsoft Outlook®. The graphical user interface presents forms (windows) to users to allow users to compose and read messages. In unified messaging systems, the messages may be of voice, facsimile, text and graphic types.

Depending on the type of message composed by a user, a message may be placed as an attachment to the message. FIGS. 1A and 1B show an example of an electronic mail (email) message composed using a compose form 10 produced by Microsoft Outlook® from Microsoft Corporation. The composed message includes message properties 12 (e.g., to, from and subject) and a message body 14 including the text of the message. The message body 14 also includes three attachments, including a text file (status.txt), a Microsoft Word® document file (txtDocument.doc), and a bitmap file (connectd.BMP). In the case of a unified message system, a voice message would also appear as an attachment to the email message.

When the message is delivered to a recipient, the received message is presented to the recipient in a similar form. FIGS. 2A and 2B show an example of the email message in a read form 20 provided by the recipient's messaging software, namely Microsoft Outlook® from Microsoft Corporation.

If the recipient receiving the message replies to the received message or forwards the received message to yet another user, the original message is placed in the reply or forwarded message as an attachment. Such an attachment is commonly referred to as an embedded message. The attached reply or forwarded message is typically represented by an icon in the body of the message. The icon representing the attachment preserves the message header or envelope information. A recipient of the reply or forwarded message must double-click on each icon within the body of the message separately to read the forwarded message and the original message. As will be appreciated, for multi-generation messages, a recipient may be required to open a number of messages, many levels deep to follow the communication history of a message. Not only that, each time an icon is double-clicked, Microsoft Outlook opens a new window to display the underlying message. This of course makes it difficult to read multi-generation messages.

Thus, there is a need to provide an improved messaging system and graphical user interface for displaying messages.

SUMMARY OF THE INVENTION

The present invention provides a graphical user interface that displays messages to a user in a manner such that attached or embedded message (as well as attachments to the embedded messages) within a message can be easily viewed with reduced user effort.

According to one aspect of the present invention there is provided a messaging system of the type supporting computer access to user messages, the improvement comprising a graphical user interface displaying messages to a user accessing said messaging system via a computer and deconstructing messages to provide a visual indication of all multi-generation embedded messages and attachment therein.

According to another aspect of the present invention there is provided a graphical user interface to display a selected message to a user in a form on a computer screen. The graphical user interface includes: a first display area within said form presenting said selected message and presenting accompanying attachments and embedded messages as selectable icons; and a second display area within said form presenting all multi-generation components of said selected message separately to allow said user to select directly individual components of said message for display.

According to still yet another aspect of the present invention there is provided a messaging system. The messaging system includes: a messaging server executing a messaging application and including memory to store user messages; and at least one user computer connected to said messaging server via a network, said user computer executing messaging software to allow a user to compose messages and to retrieve messages stored by said messaging server, said messaging software being responsive to user input and including a graphical user interface to display user messages stored by said messaging server, said graphical user interface presenting a form to display a selected user message in response to user input, said form providing a visual indication of all multi-generation components within said selected message.

The present invention provides advantages in that all embedded messages within a multi-generation message are displayed in a single window. This allows a user to select any embedded message within a received message without requiring the user to click on icons to expose those embedded messages. Once an embedded message is selected, the application associated with the embedded message is invoked.

BRIEF DESCRIPTION OF THE DRAWINGS

An embodiment of the present invention will now be described with reference to the accompanying drawings in which.

DETAILED DESCRIPTION OF THE INVENTION

The present invention relates generally to a graphical user interface to display embedded messages within a message. The graphical user interface can be implemented in virtually any messaging system, such as electronic mail systems, unified messaging systems, voice mail systems, etc. which support computer access to user messages. An embodiment of the present invention will now be described implemented in a unified messaging system.

Figure 1A:
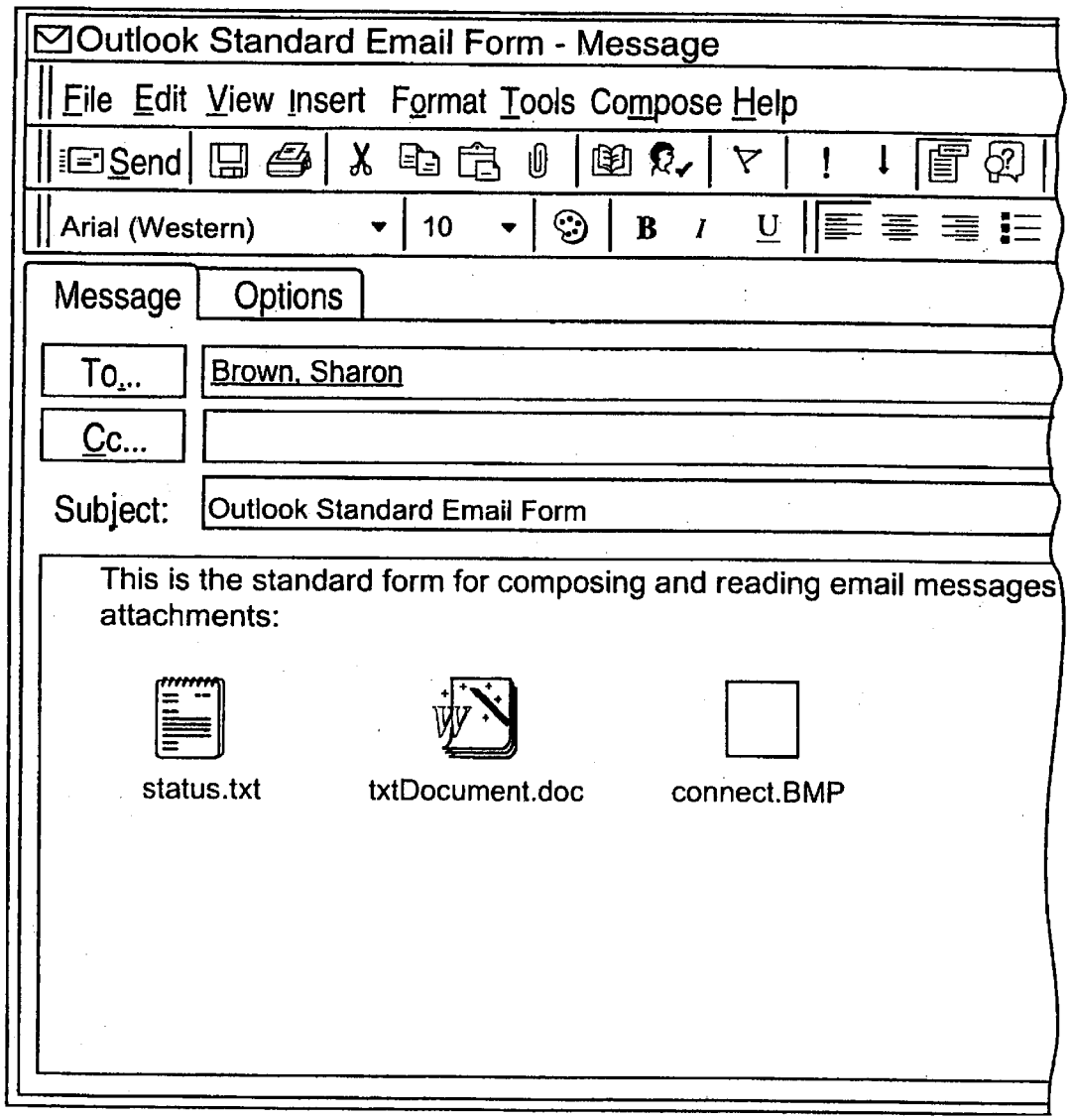
FIGS. 1A and 1B show a prior art messaging compose form presented to a user during composition of a message.
Figure 1B:
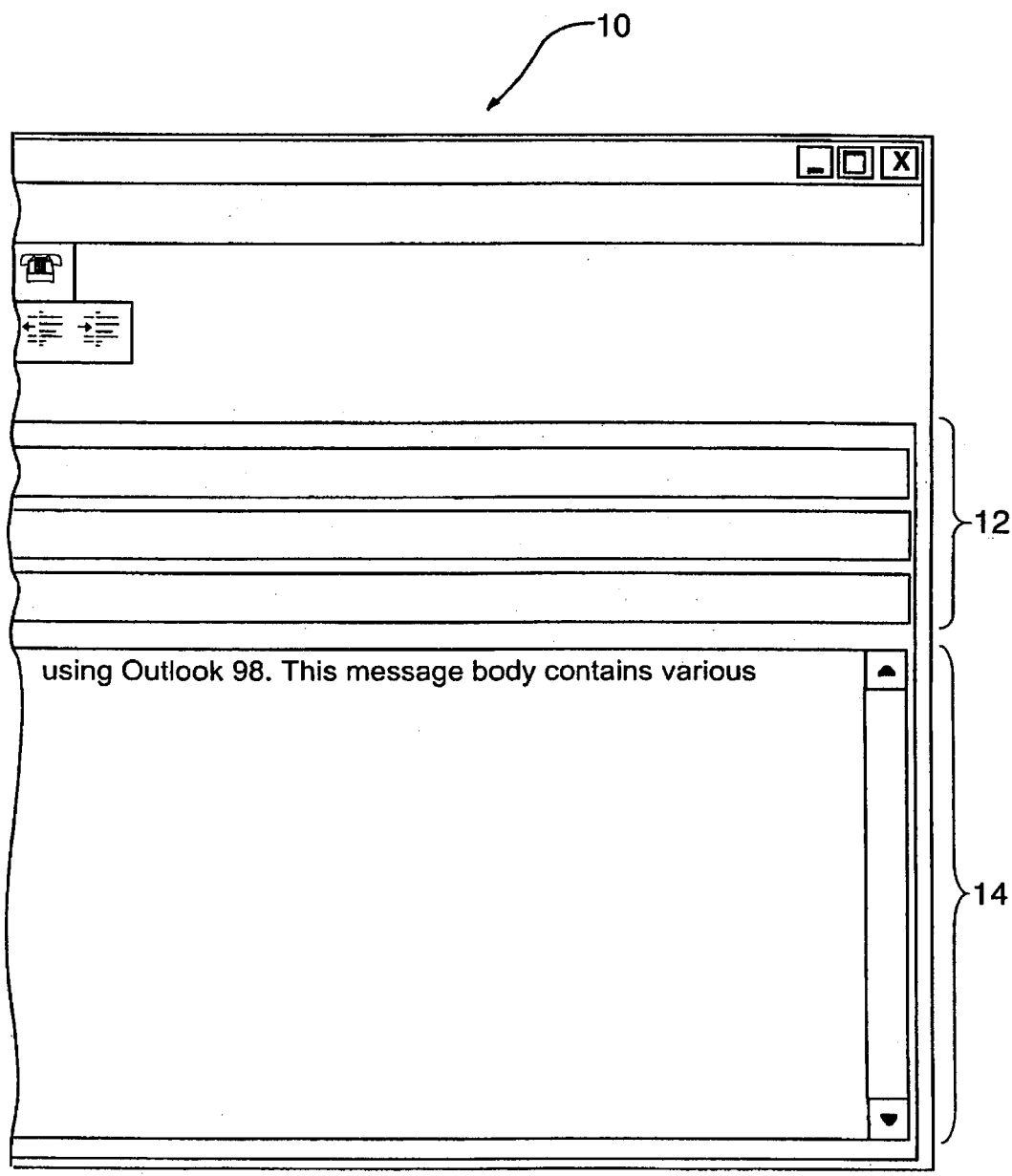
Figure 2A:
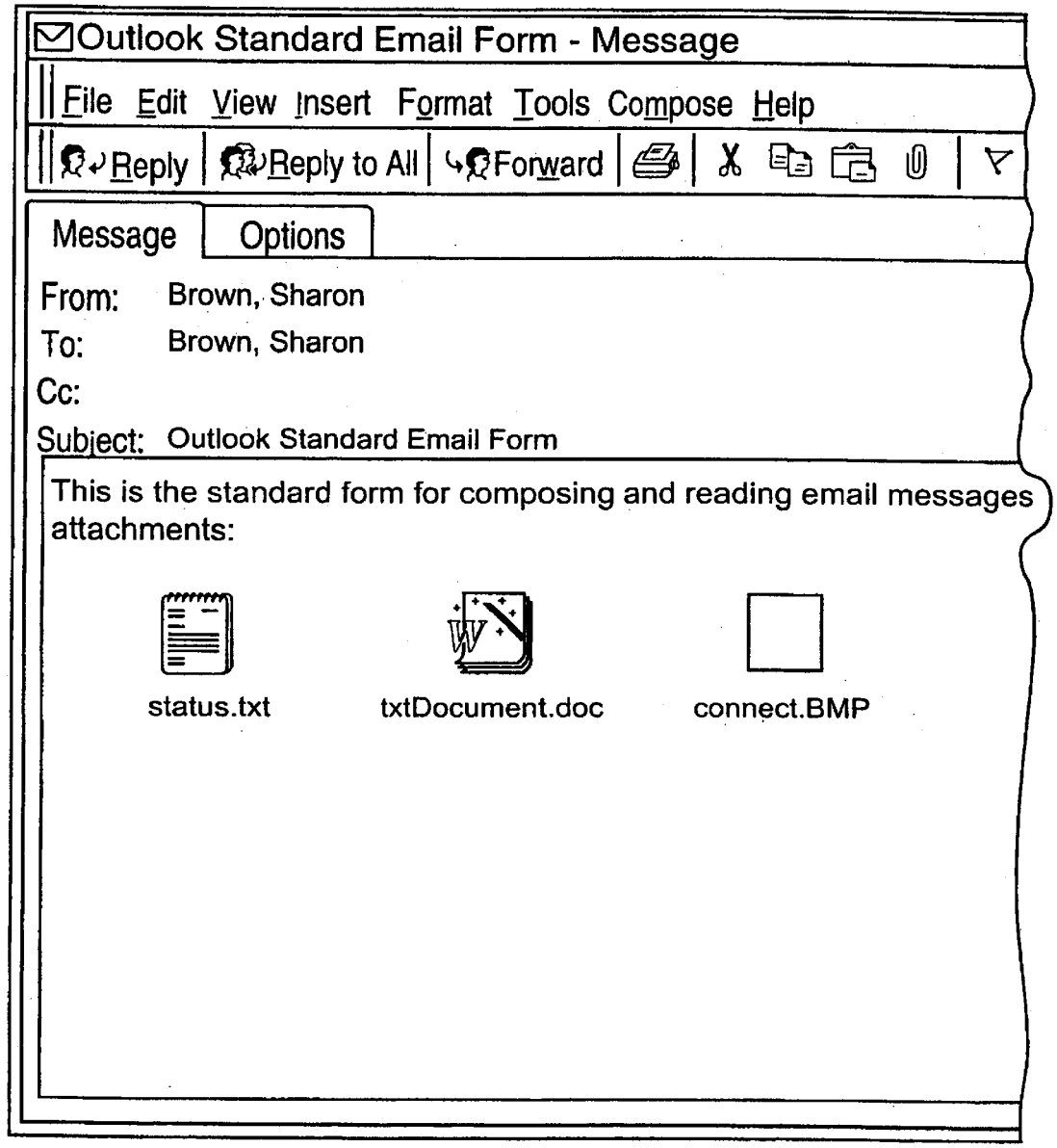
FIGS. 2A and 2B show a prior art messaging read form presented to a user when the message of FIGS. 1A and 1B is forwarded to that user by another user.
Figure 2B:
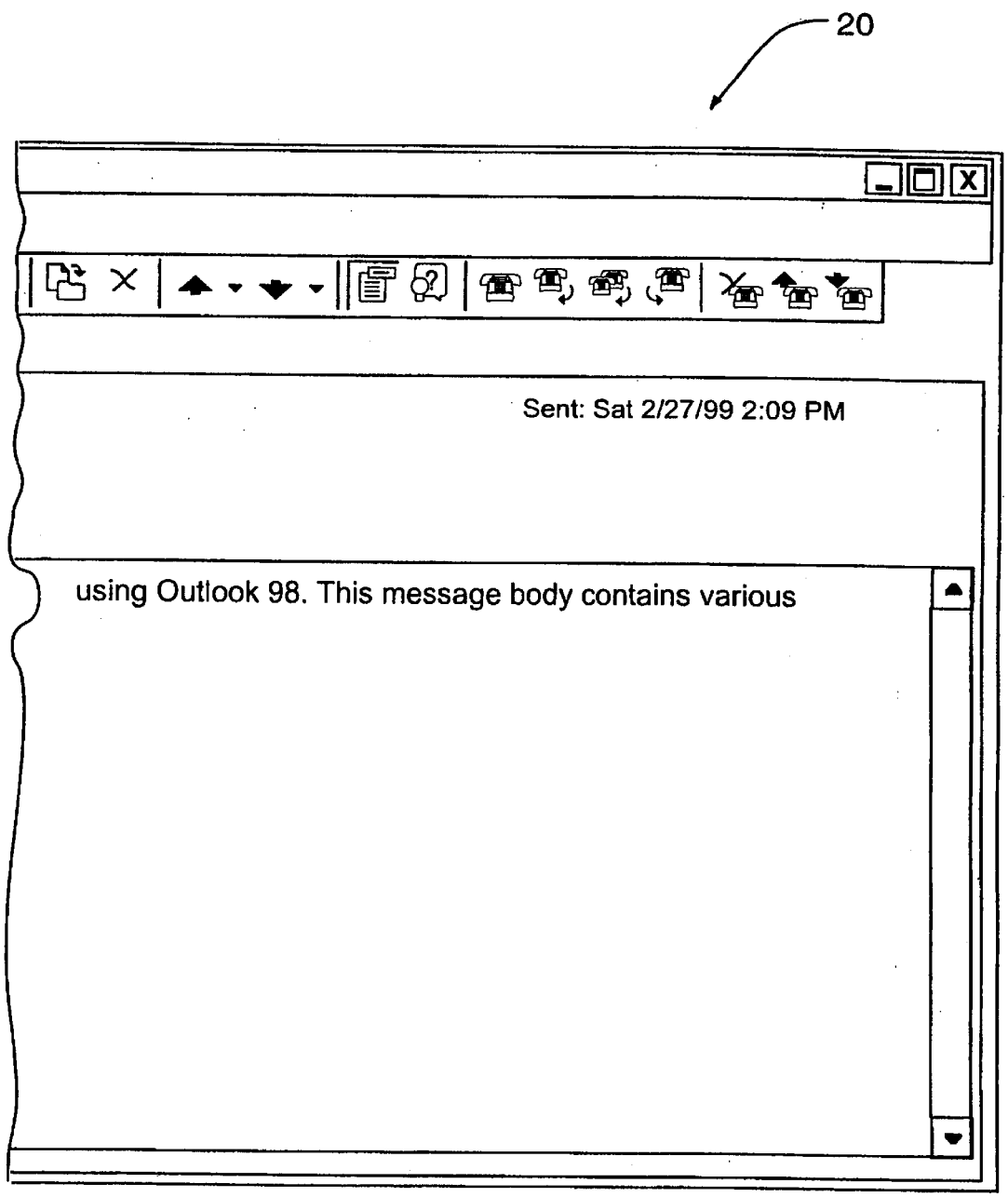
Figure 3:
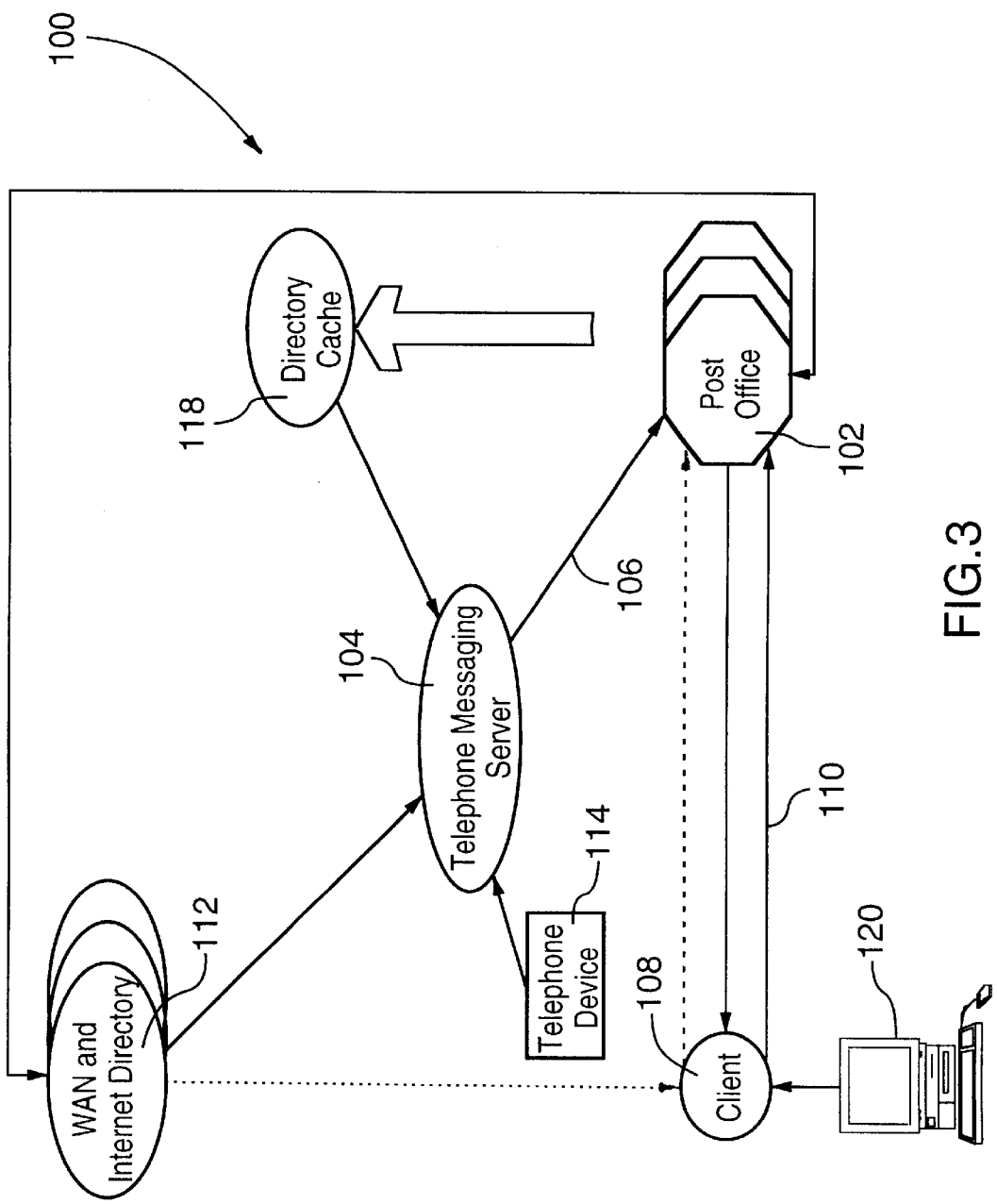
FIG. 3 is a diagrammatic overview of a unified messaging system in accordance with the present invention.

Turning now to FIG. 3, a messaging system is shown and is generally indicated by reference numeral 100. Messaging system 100 includes a post office 102 communicating with a telephony messaging server 104. The post office 102 runs on a separate server and is connected to the telephony server 104 via a local area network 106. Post office 102 communicates with clients 108, only one of which is shown, via a local area network, modem or other communication channel 110. Post office 102 and telephony messaging server 104 also communicate with external messaging systems via a wide area network 112.

The post office 102 provides message storage and delivery facilities for users of the messaging system 100 and includes mailboxes in which messages for the users are stored. The post office 102 handles and stores user messages regardless of format. Thus, the post office 102 stores voice messages received from the telephony messaging server 104 as well as text messages, facsimile messages, graphics messages etc. received from client 108 and/or wide area network 112. The post office 102 also maintains a directory database of user information including addresses, locations and addressing related information as well as user preference records as will be described. The directory database information is accessible, retrievable and updatable using database type queries. In the preferred embodiment, post office 102 runs commercially available post office software such as Microsoft Exchange® sold by Microsoft Corporation of Redmond Wash.

In one embodiment, telephony messaging server 104 is a model TS800 telephony server or similar model provided by Mitel Corporation of Ottawa, Ontario. The telephony messaging server 104 executes a voice messaging application to handle incoming telephone calls which cannot be completed. As is well known to those of skill in the art, the voice messaging application includes a speech file administrator which retrieves prerecorded voice message prompts from a database to direct a caller to leave a message for a particular called party. Messages recorded by the voice messaging application are conveyed to the post office 102 for storage in the appropriate mailboxes. The voice messaging application also handles incoming user calls to allow users to retrieve messages stored in their mailboxes.

Telephony users may access the voice messaging application using a typical telephone or telephony device 114 providing telephone functions that is either directly connected to telephony messaging server 104 or connected to the telephony messaging server 104 through a private branch exchange (PBX) and a publicly switched telephone network PSTN (not shown). During access, users enter touch-tone commands and passwords to retrieve messages from their mailboxes in the post office 102. The voice messaging application calls the speech file administrator, which provides the appropriate voice message prompts to navigate users through the voice messaging application. During message playback, if a message stored in a user's mailbox is in a format not supported by the telephone or telephony device 114 used to access the messaging system 100, the voice messaging application calls an appropriate message translator to convert the message into a form which can be played back to the user.

The telephony messaging server 104 communicates with a directory cache 118 that is updated by the post office 102. The directory cache 118 stores a subset of the information stored by the post office 102. Specifically, the directory cache stores addressing information for users and groups associated with the messaging system. The telephony messaging server 104 accesses the directory cache 118 in response to user and caller queries made via a telephone device 114 to reduce directory search times and provide a fast addressing service. Further details of the directory cache are described in Applicant's copending application identified as U.S. patent application Ser. No. 09/259,811 (now U.S. Pat. No. 6,418,200 B1), filed on Feb. 25, 1999, entitled "AUTOMATIC SYNCHRONIZATION OF ADDRESS DIRECTORIES FOR UNIFIED MESSAGING", which is hereby incorporated by reference.

Client 108 in this embodiment, is associated with or in the form of a computing device such as a personal computer 120. Through personal computer 120, a user can access voice messages, facsimile messages, electronic mail messages etc. stored in their post office mailbox. The user can also use personal computer 120 to perform messaging functions such as create, attach, read, modify, reply, forward, store and delete messages of various types.

In one embodiment, the personal computer 120 runs Microsoft Outlook® client messaging software sold by Microsoft Corporation. The client messaging software provides a graphical user interface (GUI) to display the user's messages held in their post office mailbox and to allow the user to invoke messaging functions. Since the mailboxes store messages in different formats, it is preferred that the personal computer 120 includes appropriate hardware and software to allow all message types to be retrieved. In cases where the personal computer 120 does not include the hardware and/or software necessary to support certain message types, appropriate message translators can be called to convert the messages into a form compatible with the personal computer 120.

The invention is further explained with reference to FIGS. 4A–7 which illustrate operation of the invention according to one embodiment of the invention.

Figure 4A:
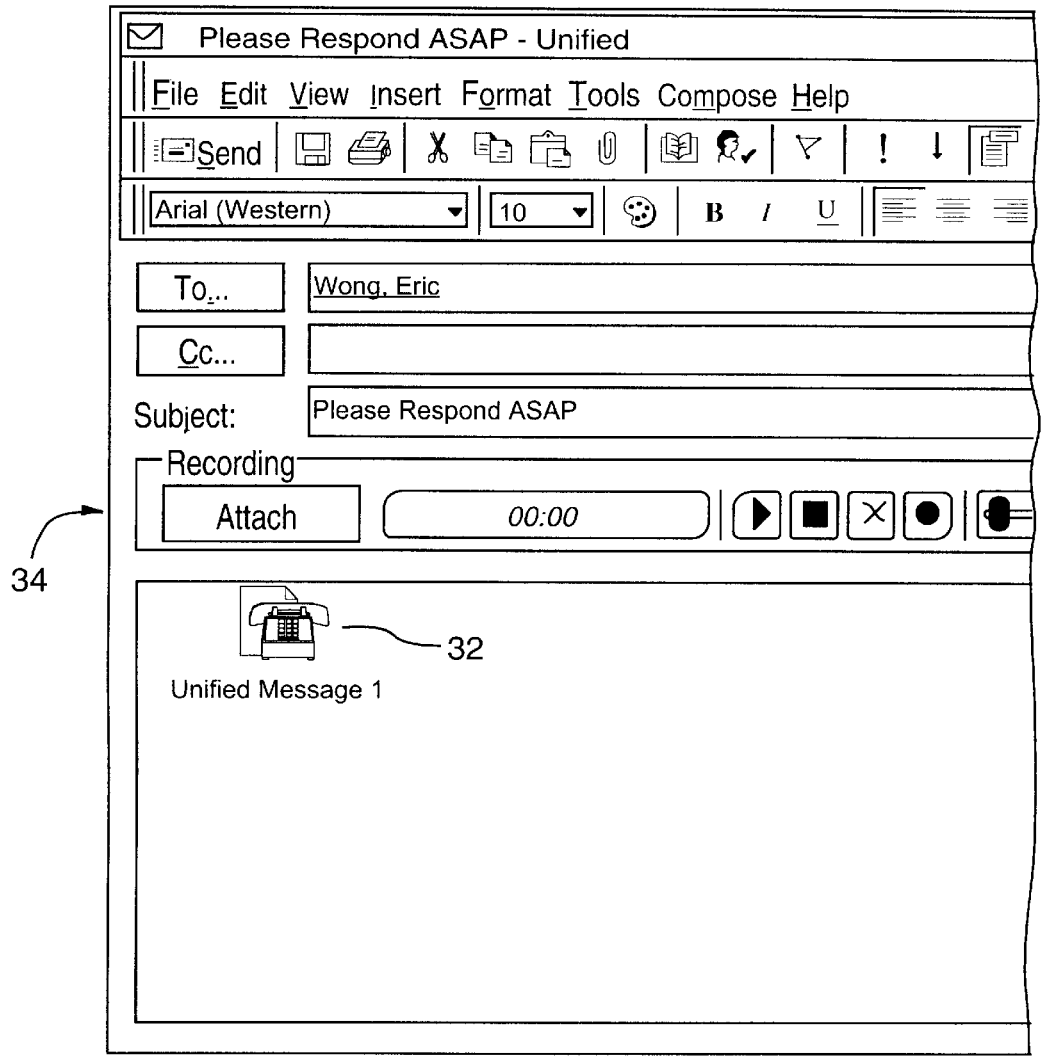
FIGS. 4A–7 illustrate operation of the invention according to one embodiment of the invention.
Figure 4A:
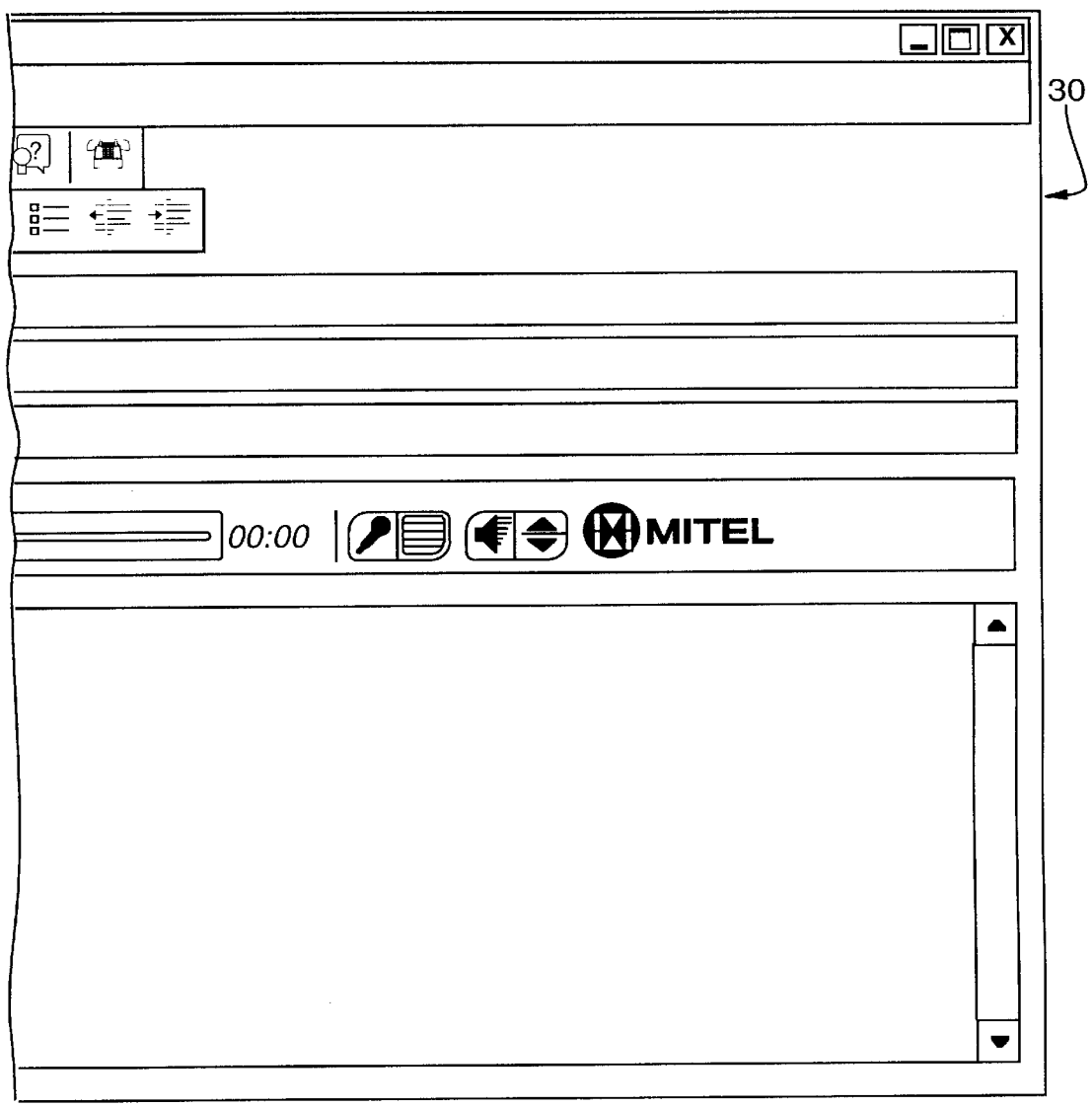

When a user accesses their mailbox and wishes to compose a message to be sent to another user of the messaging system 100, the messaging software presents a compose form 30 to a user on a display screen as shown in FIGS. 4A and 4A'. The user is then able to compose a desired message to be sent to a recipient. The representative message in the compose form 30 contains a voice attachment 32. The voice attachment 32 could have been created by the user using a voice recorder control area 34. After the message has been composed it is sent to the recipient.

Figure 4B:
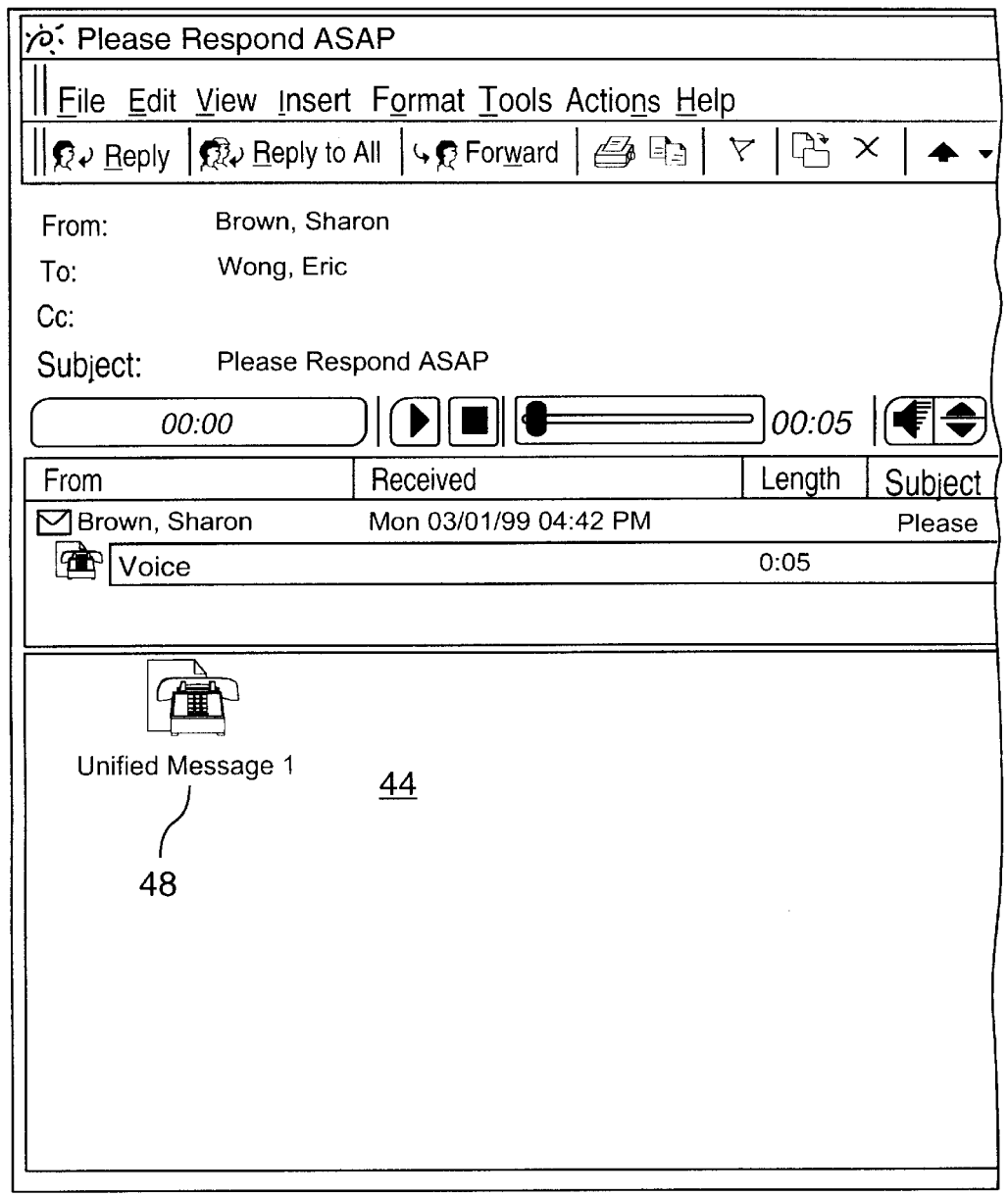
Figure 4B:
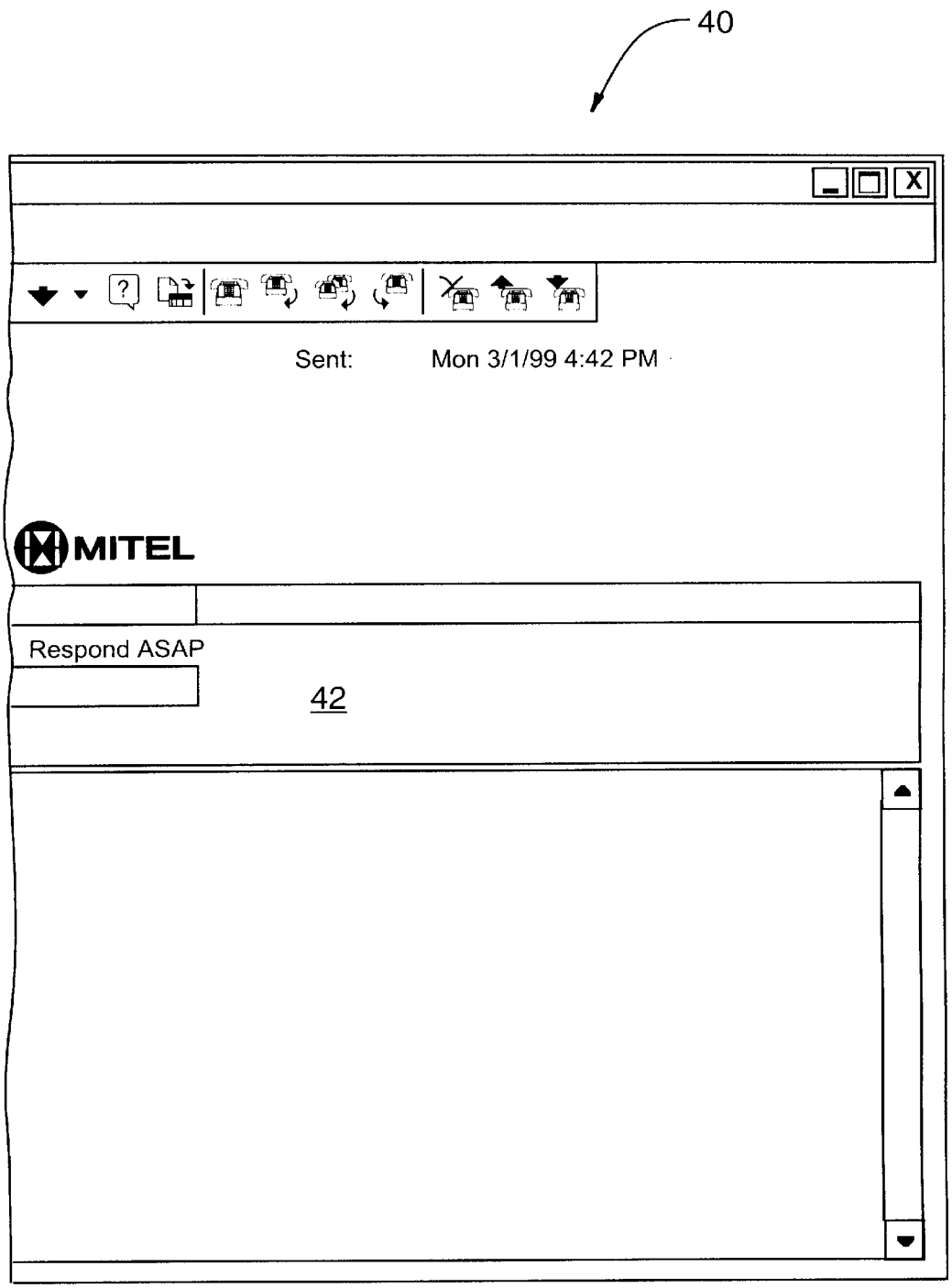

Thereafter, when the recipient accesses their mailbox to read their messages and selects the message to be read, the messaging software presents a read form 40 on a display screen as shown in FIGS. 4B and 4B'. The read form 40 contains a list view 42, a message body 44, and a properties area 46. The message body 44 is similar to a conventional read form and displays the message together with a voice attachment icon 48. The list view 42 display the message and all its attachments or embedded messages in a list format. The list view 42 indicates that the message from the sender has a voice attachment.

Figure 5A:
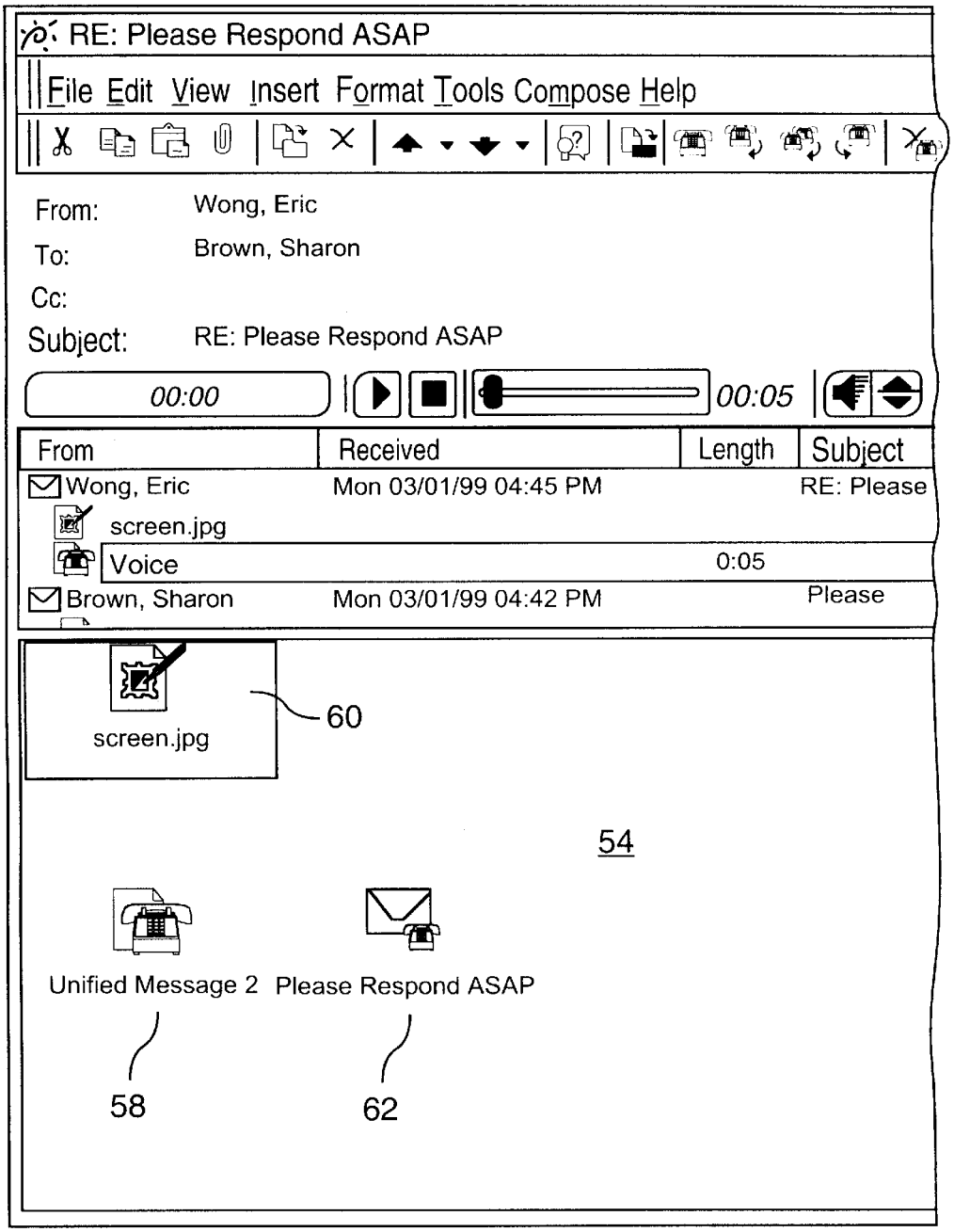
Figure 5A:
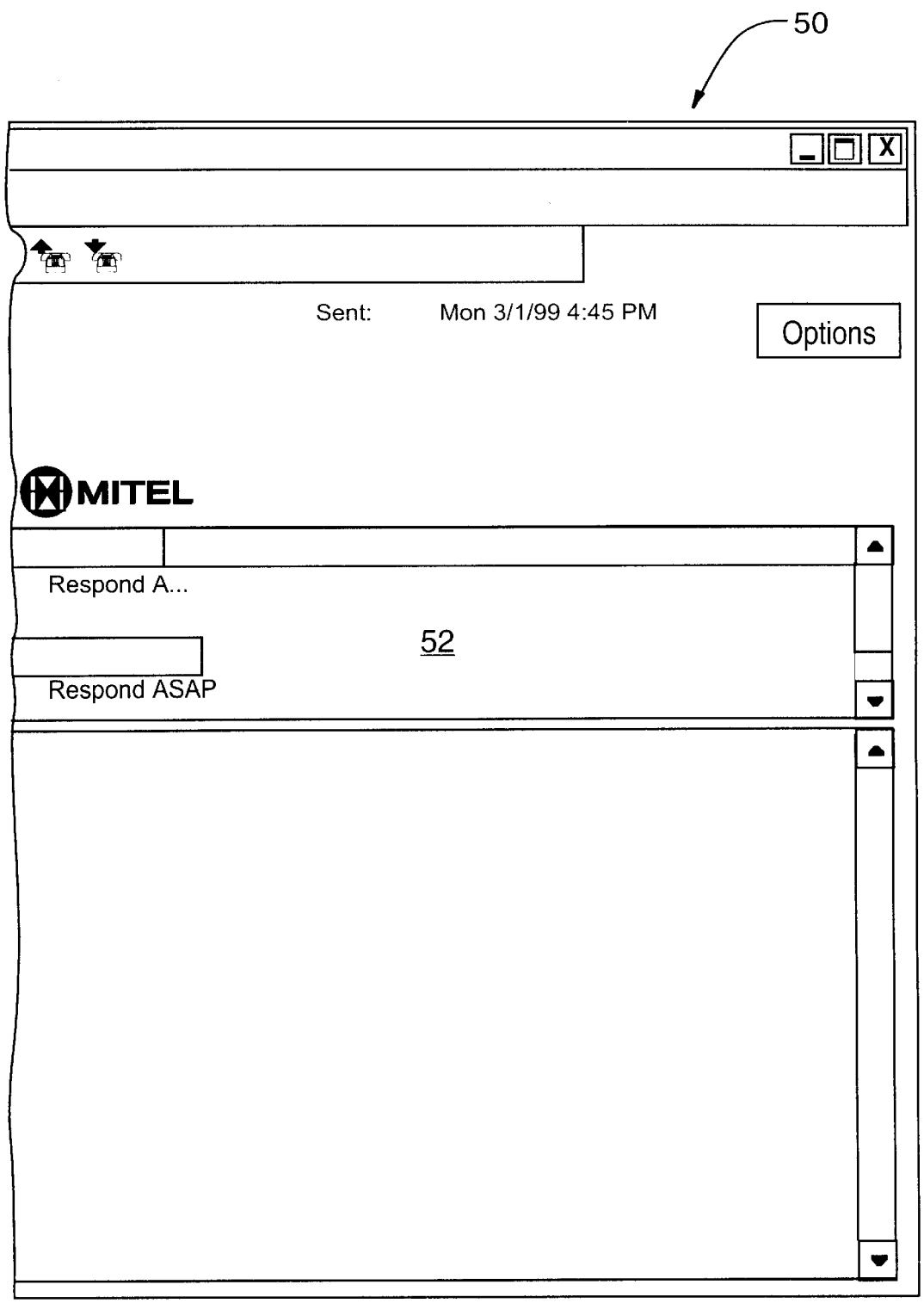
Figure 5B:
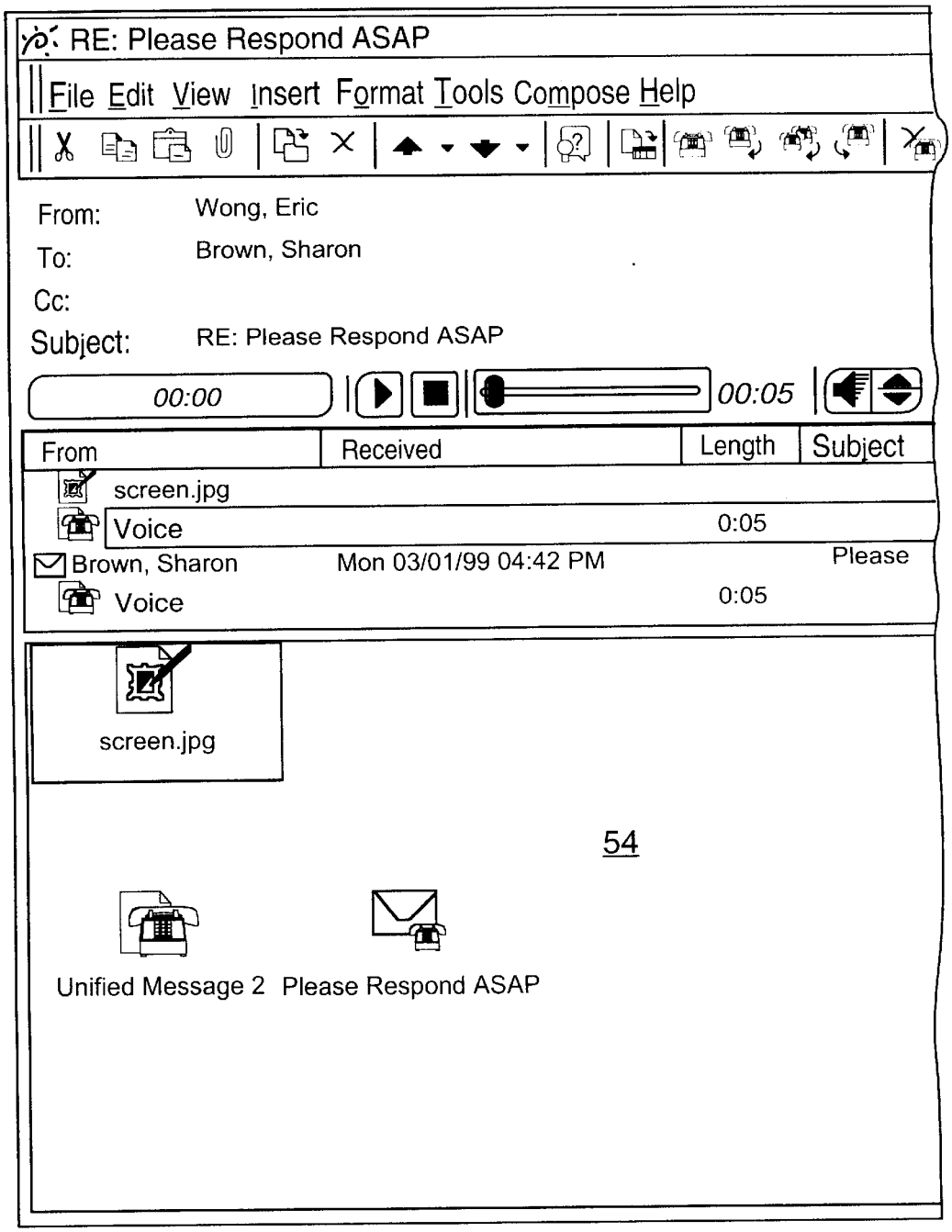
Figure 5B:
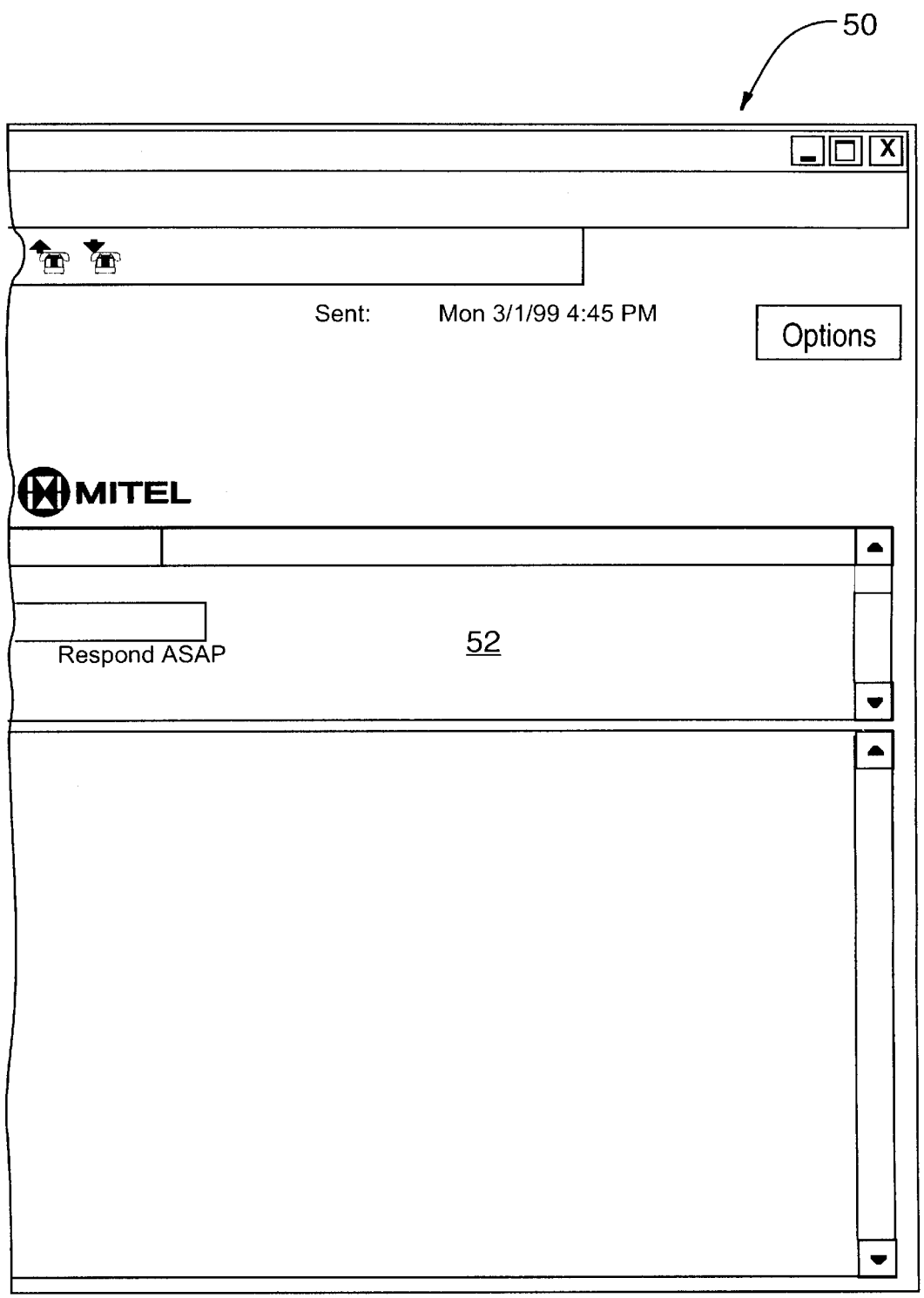

Suppose then that the recipient of the message they have received using the read form 40 replies back to the sender (or forwards the message to another) such that the reply message includes not only the original message but also additional attachments, namely a voice attachment and an image file (i.e., screen.jpg). Then, upon the original sender (now the recipient) accessing their mailbox, the messaging software presents a read form 50 on the display screen as shown in FIGS. 5A, 5A', 5B and 5B'. The read form 50 contains a list view 52, a message body 54, and a properties area 56. Here, the message body 54 indicates the voice attachment by a voice attachment icon 58, and the image file by an image icon 60. In addition, the message body 54 includes a message attachment icon 62 that indicates that a message is attached.

The list view 52 provides detailed information regarding attachments and embedded messages with respect to the reply message. FIGS. 5A and 5A' illustrate a first portion of the detailed information in the list view 52, and FIGS. 5B and 5B' illustrate a second portion of the detailed information in the list view 52. Notice that by reviewing the information in the list view 52, the recipient of the replay message is able to easily ascertain from the read form 50 that the received message has two attachments, one voice and one image file, and that the received message also has an embedded message. Each of these attachments or embedded messages identified in the list view 52 can be selected by the recipient and thus directly accessed without having to open any other windows or forms to retrieve any of the attachments in the list view 52. Hence, as an example, the recipient can directly select the voice attachment to the original message without having to open or select the embedded message to which the voice attachment is attached.

Thus, in the case of multi-generation messages where attachments and embedded messages may be deeply embedded in the message, the messages are fully de-constructed into their components and presented separately. This allows the user to select the message or any attachment or embedded message within the message. When the message, an attachment or an embedded message is selected from the list, the messaging software invokes the application associated with the selected message or attachment.

Figure 6A:
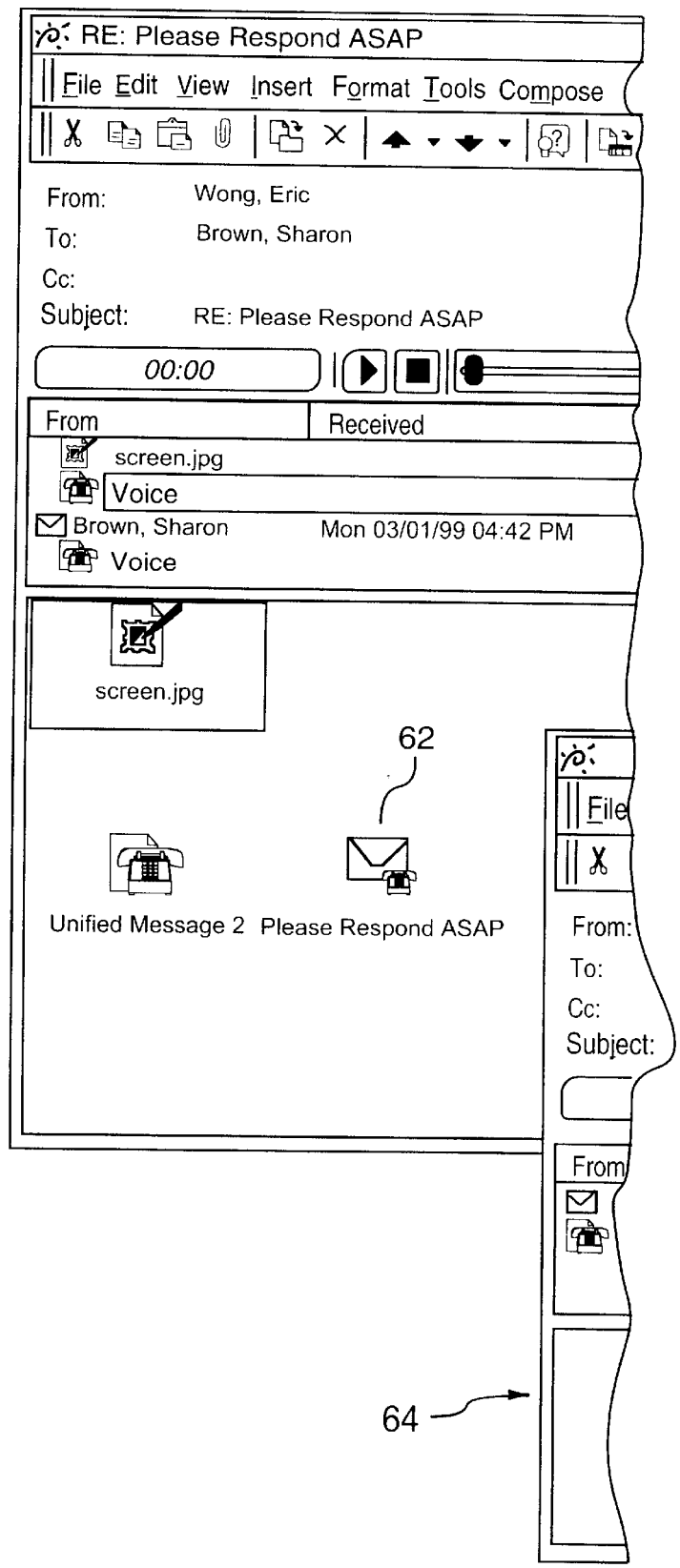
Figure 6B:
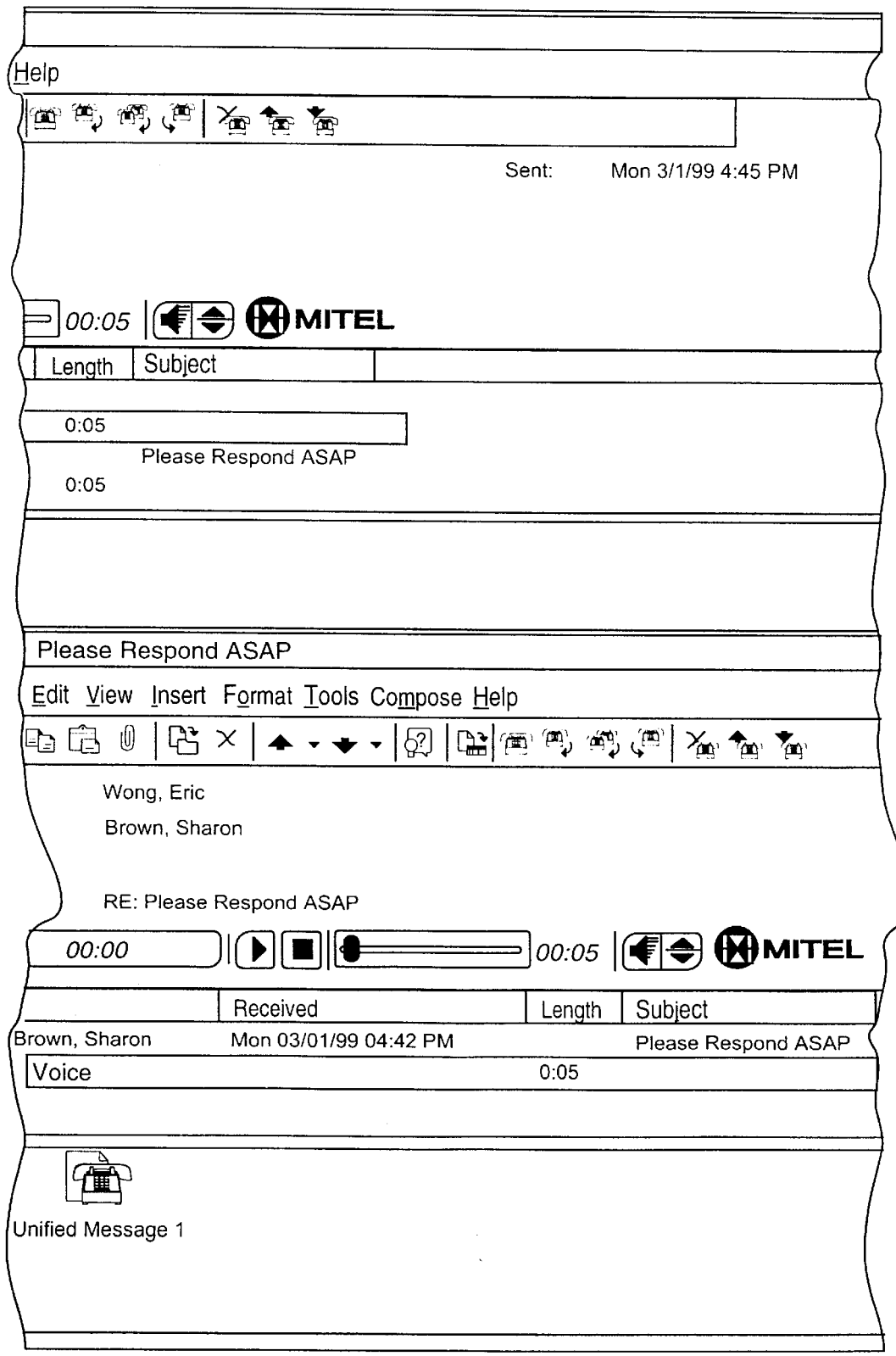
Figure 6C:
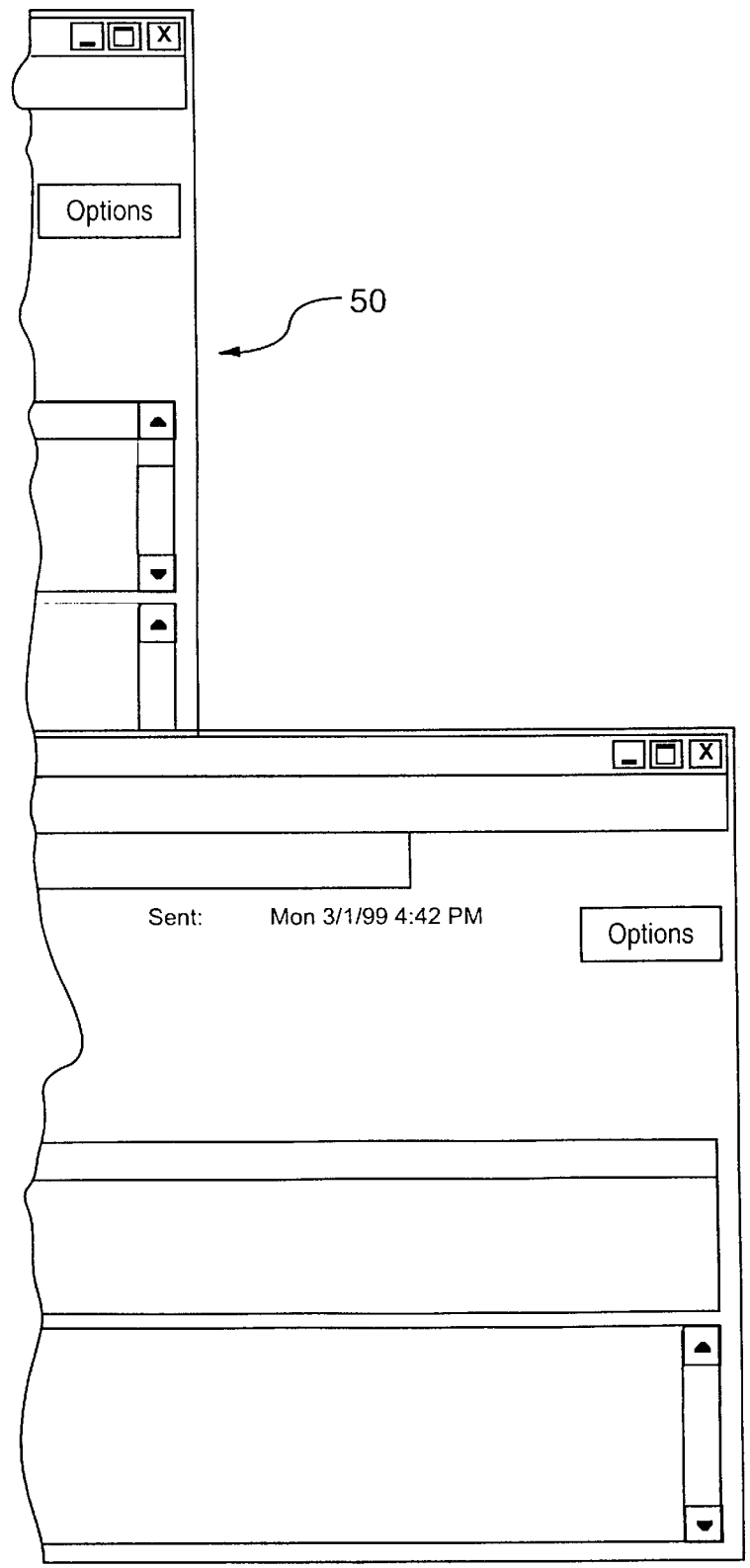

FIGS. 6A, 6B and 6C illustrate a view on the display screen that occurs after the recipient selects (e.g., double-clicks using a pointing device) the message attachment icon 62 from the read form. In such case, an additional form 64 (window) is opened and represents the attached message. Note that the attached message is the same as the read form 40 in FIGS. 4B and 4B' for the reception of the original message.

Figure 7:
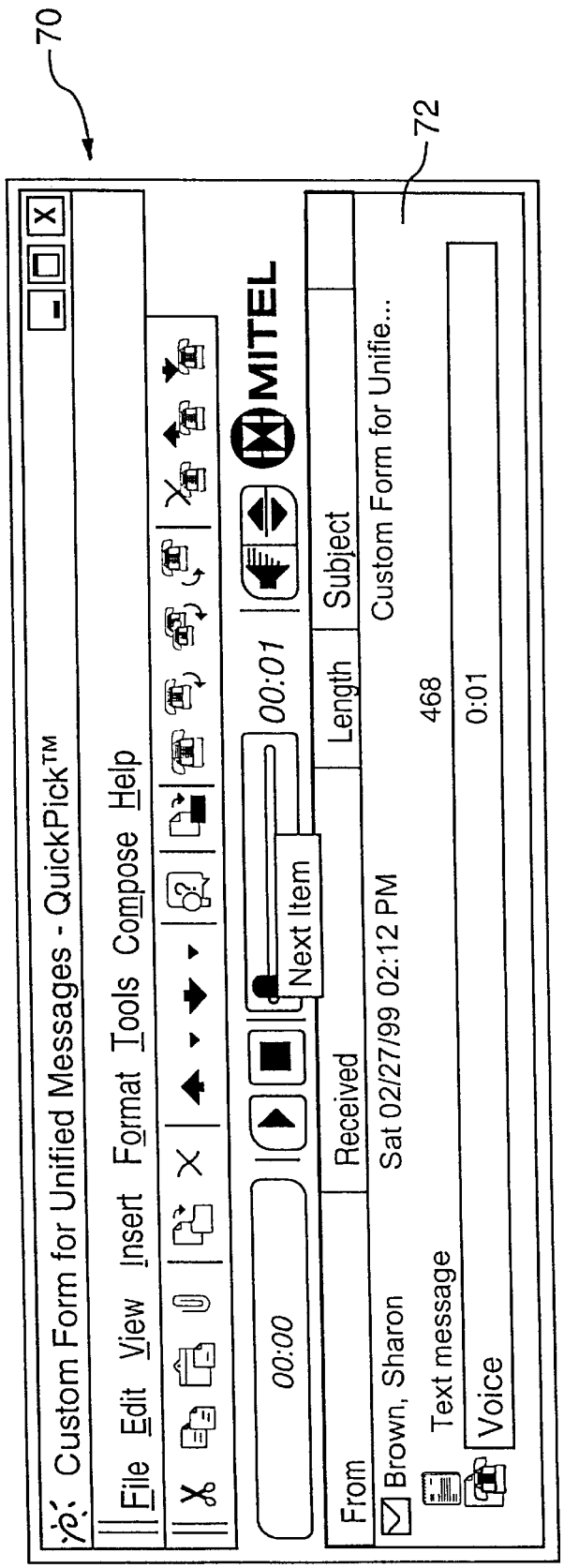

FIG. 7 illustrates a view of a short or condensed version of a read form 70. The read form 70 includes a list view 72 but conserves space by not also providing a message body or message properties. The list view 72 is similar to the list view 52 in FIGS. 5A, 5A', 5B and 5B' although pertaining to a different message.

The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices. The computer readable medium can also be distributed over a network coupled computer systems so that the computer readable code is stored and executed in a distributed fashion.

As will be appreciated, since multi-generation messages are de-constructed and displayed, a user is provided with quick and easy access to all components of these types of messages. Although a preferred embodiment of the present invention has been described, those of skill in the art will appreciate that variations and modifications may be made without departing from the spirit and scope thereof as defined by the appended claims.

We claim:

1. In a messaging system of the type supporting computer access to user messages, the improvement comprising a graphical user interface displaying messages to a user accessing said messaging system via a computer and deconstructing messages to provide a visual indication of all multi-generation embedded messages and attachments therein simultaneously in a form.

2. The messaging system of claim 1 wherein said graphical user interface deconstructs messages when said messages are selected by said user.

3. The messaging system of claim 2 wherein said graphical user interface presents said embedded messages and attachments in a list.

4. The messaging system of claim 3 wherein said graphical user interface allows said user to select embedded messages and attachments in said list to invoke applications associated therewith.

5. A graphical user interface to display a selected message to a user in a form on a computer screen comprising:
- a first display area within said form presenting said selected message; and
- a second display area within said form simultaneously presenting all multi-generation components of said selected message separately to allow said user to select directly individual components of said message for display.

6. A graphical user interface as defined in claim 5 wherein said second display area presents said components in a list.

7. A messaging system comprising:
- a messaging server executing a messaging application and including memory to store user messages; and
- at least one user computer connected to said messaging server via a network, said user computer executing messaging software to allow a user to compose messages and to retrieve messages stored by said messaging server, said messaging software being responsive to user input and including a graphical user interface to display user messages stored by said messaging server, said graphical user interface presenting a form to display a selected user message in response to user input, said form providing a visual indication of all multi-generation components within said selected message simultaneously.

8. A messaging system as defined in claim 7 wherein said components include attachments and embedded messages within said selected message.

9. A messaging system as defined in claim 8 wherein said form presents said components in a list.

10. A messaging system as defined in claim 9 wherein said messaging software is responsive to selection of any component in said list to invoke the application associated with said selected component.

11. The graphical user interface of claim 5, wherein said first display area presents accompanying attachments and embedded messages as selectable icons.

* * * * *